(12) United States Patent
Vahab

(10) Patent No.: US 8,616,941 B2
(45) Date of Patent: Dec. 31, 2013

(54) PIN BONE REMOVER

(75) Inventor: Ali Vahab, Kista (SE)

(73) Assignee: Trio FTC Sweden AB, Arlandastad (SE)

( * ) Notice: Subject to any disclaimer, the term of this patent is extended or adjusted under 35 U.S.C. 154(b) by 0 days.

(21) Appl. No.: 13/698,820

(22) PCT Filed: May 17, 2011

(86) PCT No.: PCT/SE2011/050618
§ 371 (c)(1),
(2), (4) Date: Nov. 19, 2012

(87) PCT Pub. No.: WO2011/146004
PCT Pub. Date: Nov. 24, 2011

(65) Prior Publication Data
US 2013/0078898 A1    Mar. 28, 2013

(30) Foreign Application Priority Data
May 20, 2010    (SE) ...................................... 1050502

(51) Int. Cl.
*A22C 17/00* (2006.01)
(52) U.S. Cl.
USPC ......................................................... 452/135
(58) Field of Classification Search
USPC .................................. 452/135, 160–163, 170
See application file for complete search history.

(56) References Cited

U.S. PATENT DOCUMENTS

| | | | |
|---|---|---|---|
| 4,336,634 A * | 6/1982 | Braeger ......................... | 452/135 |
| 4,748,723 A * | 6/1988 | Braeger et al. ................. | 452/122 |
| 5,413,525 A * | 5/1995 | Braeger et al. ................. | 452/165 |
| 5,525,101 A | 6/1996 | Soderlind | |
| 5,536,205 A * | 7/1996 | Braeger et al. ................. | 452/161 |
| 5,911,621 A | 6/1999 | Durst et al. | |
| 6,142,862 A | 11/2000 | Dalgord et al. | |
| 6,200,211 B1 * | 3/2001 | Braeger et al. ................. | 452/162 |
| 6,280,313 B1 * | 8/2001 | Braeger et al. ................. | 452/161 |
| 6,322,437 B1 * | 11/2001 | Grabau et al. ................. | 452/161 |
| 7,081,048 B2 * | 7/2006 | Bech ............................. | 452/161 |
| 7,090,574 B2 * | 8/2006 | Braeger et al. ................. | 452/162 |
| 7,247,086 B2 | 7/2007 | Schneidedr | |

(Continued)

FOREIGN PATENT DOCUMENTS

WO        2008020786  A1     2/2008

OTHER PUBLICATIONS

International Search Report, date Aug. 18, 2011, from corresponding PCT application.

*Primary Examiner* — Richard Price, Jr.
(74) *Attorney, Agent, or Firm* — Young & Thompson

(57) ABSTRACT

A pin bone removing apparatus for removing pin bones from fish fillets includes a drive train and a rotatable cylinder head coupled to the drive train. The apparatus includes a torque limiter, which for a preset torque value will uncouple the rotatable cylinder head from the drive train. A method is also provided for removing pin bones from fish fillets, by pinching the pin bone in question between a rotating cylinder with recesses and a resilient tongue in contact with the cylinder. During the pinching, the pulling force is applied to the fish pin bone until the force reaches a preset level, at which the pulling is interrupted for a short period of time, unless the pin bone immediately comes loose, and if it does not come loose the pulling force is applied again until it reaches the preset level, and this process is repeated until the bone comes loose.

15 Claims, 5 Drawing Sheets

(56) References Cited

U.S. PATENT DOCUMENTS

| | | | |
|---|---|---|---|
| 7,927,194 B2* | 4/2011 | Jurs et al. | 452/135 |
| 2004/0253915 A1* | 12/2004 | Braeger et al. | 452/161 |
| 2006/0105691 A1 | 5/2006 | Schneider | |
| 2012/0149290 A1* | 6/2012 | Jurs et al. | 452/162 |
| 2013/0035023 A1* | 2/2013 | Jurs | 452/162 |
| 2013/0059514 A1* | 3/2013 | Jurs et al. | 452/162 |

* cited by examiner

PIN BONE REMOVER

The present invention relates to an apparatus for removing nerve bones from fish fillets, and in particular to an improved apparatus minimizing the risk of pin bones breaking in the process of removing them.

BACKGROUND OF THE INVENTION

It is common to sell several types of fish in the form of fillets already deboned. These fillets are obtained by cutting the fish along each side of the backbone by hand, with a knife or using apparatus or machines. Each of these machines or apparatuses is designed for separating the backbone, avoiding damage to the integrity of the fillets. However, the presence of nerve bones ("pin bones") obliges further boning for rendering an acceptable product). Therefore, after cutting the fillets, some bones (pin bones) remain adhered or, in some cases, they remain inserted in the fillets and shall be extracted.

This problem is present during all types of fillet processing and is particularly complex in countries where fillets production is intended for the most demanding markets, implying compliance with the highest quality standards.

The quality highly relates with the time elapsing from the fish death until the product arrive to its destination place, comprising the time spent in processing and packaging.

U.S. Pat. No. 5,525,101 discloses a device for removing pin bones comprising a roller including bone capturing means. Once captured, the bones are extracted applying a traction force.

U.S. Pat. No. 7,247,086 relates to an apparatus and procedure for extracting pin bones from fish fillets, employing the basic principle of the '101 patent above. The procedure comprises detaching the pin bones from the meat using vibrations, and then, extracting the pin bone using only enough traction force in order to pull out the pin bones, thus preserving its integrity, without damaging the interior and exterior of the meat. The apparatus comprises a vibration generator, a boning device, and means transmitting said vibrations from the generator to the boning device.

SUMMARY OF THE INVENTION

Although the prior apparatuses described above represented progress in the field of mechanized removing of pin bones from fish fillets, there is still room for improvements.

Namely, there is a problem in that in some pin bones in particular have a tendency to break, thereby leaving a piece of pin bone inside the fillet, which is regarded as unacceptable from a quality point of view. In particular this can be the case with pin bones located at the head side of the fillets because they are thicker and harder and break more easily. Therefore, the object of the invention is to provide an improved pin boning apparatus that eliminates, or at least substantially reduces the risk of pin bones breaking when being pulled out form the fillet.

This object is met in a first aspect by an apparatus as claimed in claim 1, namely by a pin bone removing apparatus for removing pin bones from fish fillets, the apparatus comprising a drive train including a motor, a drive axis coupled to the motor, and a rotatable cylinder head coupled to said drive axis, wherein the cylinder head has a recessed envelope surface, and a resilient tongue in contact with said envelope surface, such that pin bones can be pinched between the tongue and the envelope surface when the cylinder head is rotated so as to be pulled out from the fillet. The apparatus is characterized in that it comprises a torque limiter that for a preset torque value will uncouple the rotatable cylinder head from being driven.

In a further aspect the cylinder head is provided as a separate component that can be coupled to the drive axis of a pin bone removing apparatus.

The invention can be implemented in a hand held tool, or in a table based machine.

In still a further aspect there is provided a method for removing pin bones from fish, defined in claim 13. The method comprises removing pin bones from fish fillets, wherein the method comprises pinching the pin bone in question between a rotating cylinder with recesses and a resilient tongue in contact with the cylinder, whereby when the pinching is performed a pulling force is applied to the fish bone. The method is characterized in that during the pinching, the pulling force is applied to the fish pin bone until the force reaches a preset level, at which the pulling is interrupted for a short period of time, unless the pin bone immediately comes loose, and if it does not come loose the pulling force is applied again until it reaches the preset level, and this process is repeated until the bone comes loose.

Further scope of applicability of the present invention will become apparent from the detailed description given hereinafter and the accompanying drawings which are given by way of illustration only, and thus not to be considered limiting on the present invention, and wherein FIG. 1 shows schematically the constitution of a typical pin bone;

Figure 5:
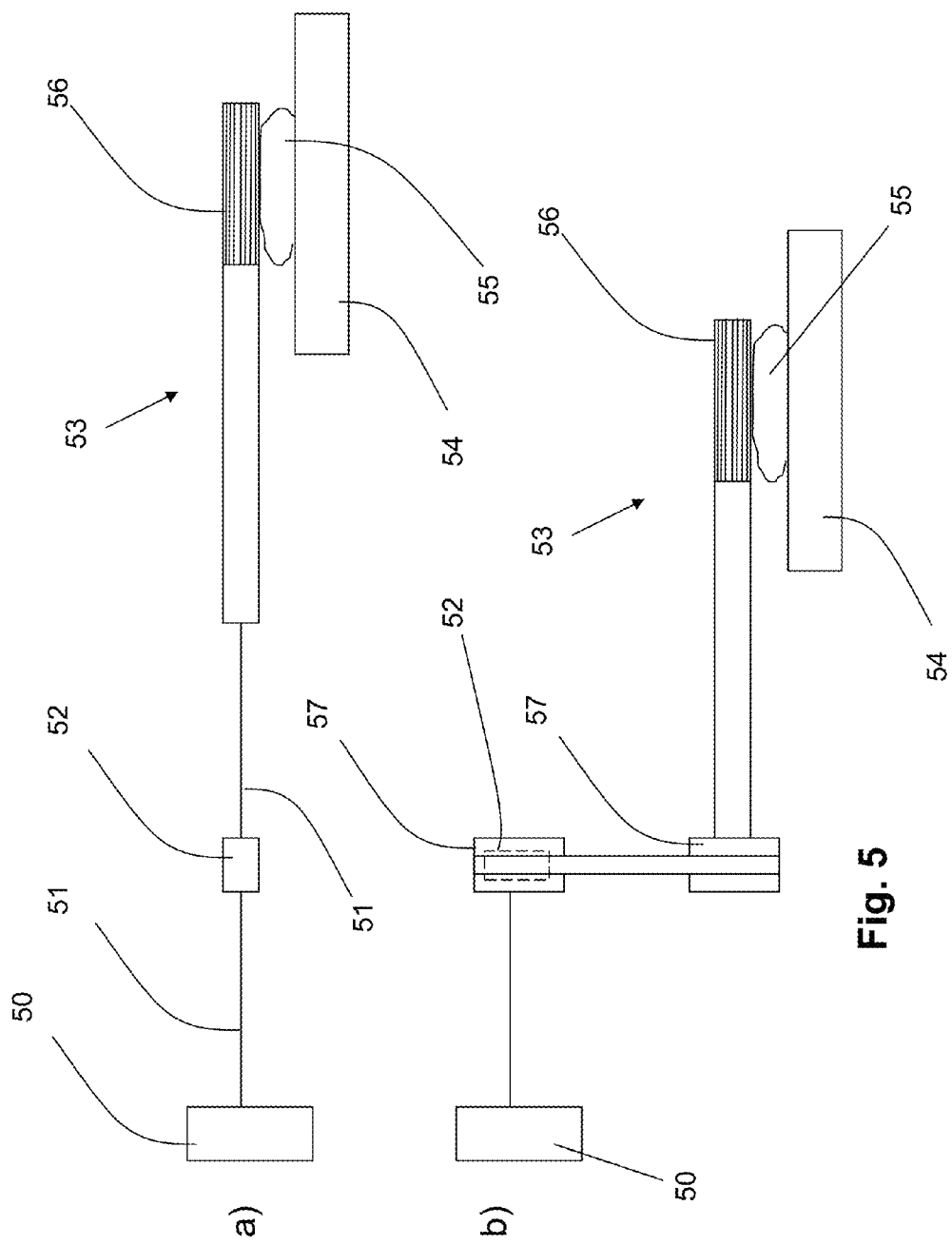

FIG. 5a schematically illustrates an alternative way of implementing the invention; and FIG. 5b schematically illustrates a still further embodiment.

DETAILED DESCRIPTION OF PREFERRED EMBODIMENTS

The present invention is concerned with the problem associated with removing pin bones from fish fillets in the processing of the fish after catch.

Figure 1:
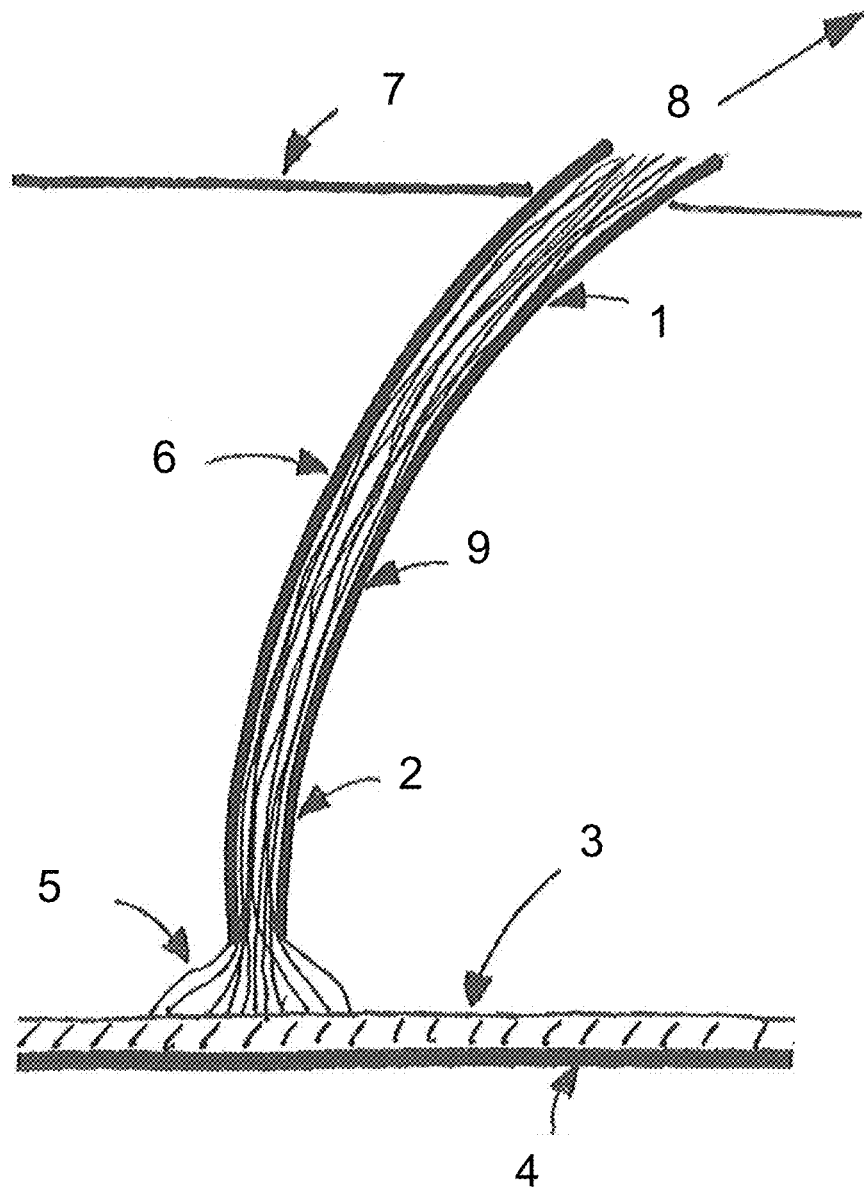

A typical Salmon/Trout pin bone is shown schematically in FIG. 1.

It comprises a tubular structure having a hard end 1 and a soft end 2. Inside the tubular structure twenty-two nerves 5 run. The nerves are attached to the thin muscle layer 3 just beneath the skin 4. On the outside of the tubular structure there is a thin layer referred to as a white membrane 6. Before rigor mortis (which occurs after the fish has been killed) the white membrane is strongly connected to the fish meat. Eventually, when rigor mortis no longer prevails, the white membrane will soften due to enzymatic action and will thus no longer connect so strongly to the meat tissue, and it will become much easier to remove the pin bone. However, despite this, there still often times occurs that the pin bone is broken off when pulled out (pulling direction indicated at 8). The break occurs in the mid region 9 of the pin bone. This breakage problem is most outspoken for the pin bones located at the head end of the fillet.

Figure 2:
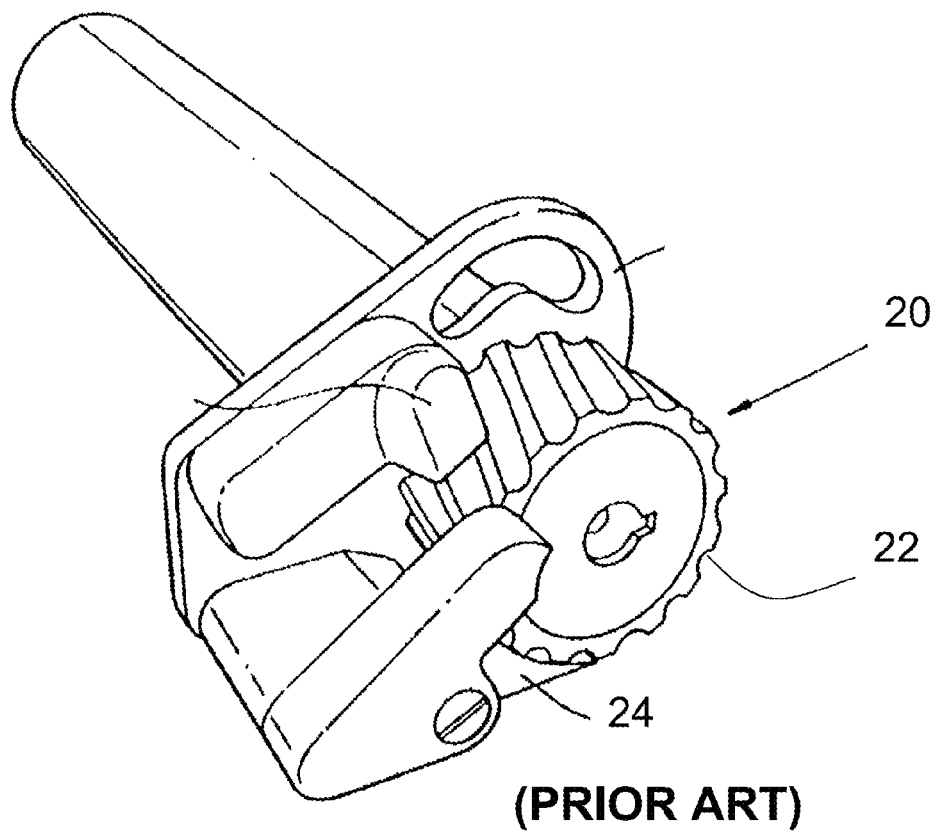
FIG. 2 is a perspective view of a prior art pin bone remover.

In FIG. 2 there is shown a prior art pin bone remover according to U.S. Pat. No. 5,525,101, mentioned in the Background section. This apparatus comprises a rotatable essentially cylindrical element 20 of cylindrical shape, mounted axially on the outgoing shaft of a driving unit, such as an electrical, pneumatic or hydraulic motor. The cylinder 20 is provided with a plurality of recesses 22 for receiving the pin bones to be removed. The cylinder is rotated, and when the apparatus is moved across the surface of a fish fillet, bones will be caught by the recesses in the cylinder, and 'squeezed' in the nip between the cylinder and an element in the form of a tongue 24 or lip, which is in slight pressure contact with the cylinder surface. This tongue or lip 24 is slightly resilient to accommodate the bones there between.

Thus, this prior art apparatus is operated in a manner that one might refer to as 'continuous', i.e. the rotatable element rotates at a constant speed of rotation. The speed may be adjustable, but the pulling movement is a continuous one.

The inventor surprisingly discovered that if instead of running the rotatable element at a constant speed of rotation, if one provides a mechanism for causing conditional intermittent pulling on the bone, the tendency to break is virtually eliminated.

The way this intermittent pulling is achieved in one embodiment is by integrating a mechanism in the drive line for the pin bone remover that will sense the resistance from the pin bone. This mechanism also comprises a pulling force setting mechanism, such that a maximum allowable pulling force can be set. At a predetermined resistance force, and if the pin bone resistance exceeds the maximum allowed pulling force provided by the rotatable element, the rotatable element will "let go", i.e. stop pulling for a fraction of a second, and then start over with a new pulling action.

This "intermittent" pulling will continue until the bone comes loose and is pulled out form the fish meat without breaking.

Thus, in a situation where the bones are not very strongly "anchored" in the meat, the device will behave just like the prior art device according to U.S. Pat. No. 5,525,101 referred to above, i.e. there will be a smooth, continuously running bone removing action, without the intermittent action.

Figure 3:
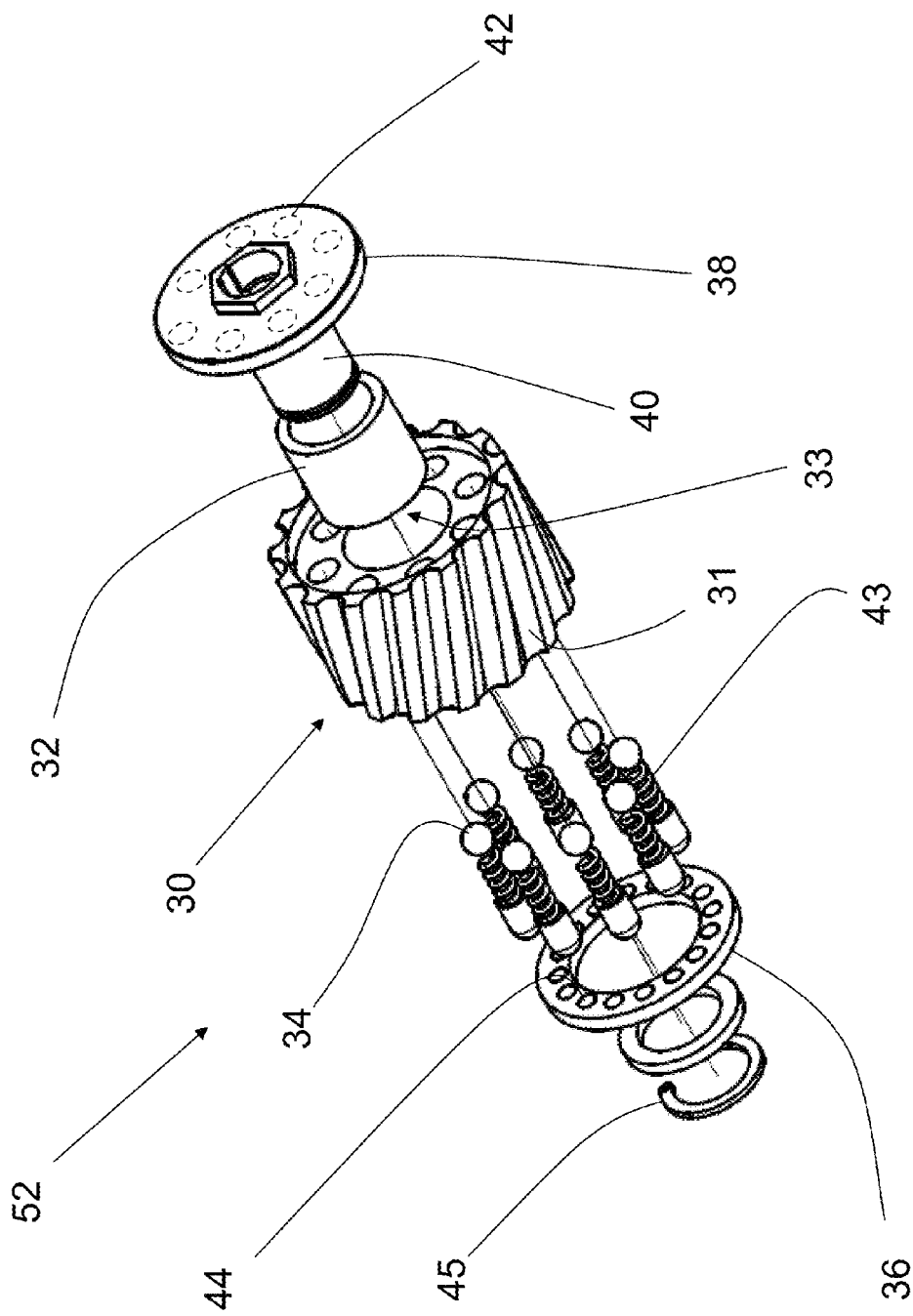
FIG. 3 shows in an exploded perspective view an embodiment of the mechanism for performing the function according to the present invention.

Referring now to FIG. 3 one example of a mechanism suitable for implementing the function mentioned above will be described in detail.

FIG. 3 illustrates in an exploded view one embodiment of the design of the rotatable cylindrical head of a pin bone remover, generally shown at 20 in FIG. 2. In FIG. 3 also the mechanism for transferring rotation from a drive axis (not shown), and comprising components required for achieving the inventive function, is shown.

Thus, the head 20 comprises an outer cylinder 30 having a plurality of recesses 31 running across the envelope surface in the longitudinal direction of the cylinder 30. In the shown embodiment these recesses are straight, but in preferred embodiments they run at an angle to the longitudinal direction across the envelope surface, as can be seen in FIG. 2. The cylinder 30 is suitably made of hard stainless steel or similar hardness in order to render it durable. This material is fairly costly and thus the material thickness of the cylinder 30 is only about 40 mm.

The cylinder 30 is attached to an inner solid cylinder block 32 made of e.g. hard stainless steel or similar hardness Of course the assembly could be made in a single piece of material too.

The inner cylinder 32 and the outer cylinder 30 are attached to each other by shrinkage. The inner cylinder 32 has a central bore 33 through which a drive axis (not shown in FIG. 3) for rotating the cylinders run. However, the axis is not in driving engagement directly with the cylinder 32, since there is provided a small tolerance between the axis and the inner wall of the bore.

The mechanism for the actual transfer of rotational motion from axis to the cylinder head will now be described in detail below.

The basic inventive idea is to make the transfer of energy from the rotational axis to the cylinder head conditional on the force with which a pin bone is attached in the fish meat. By this we mean that if the pin bone is so strongly attached that pulling it in a continuous movement (like with a prior art pin bone remover) would break it, the imposed "condition" would be to interrupt pulling at a preset maximum force, but then immediately continue pulling again and again until eventually the bone comes loose from the flesh without breaking. This action could be described as a rapidly repeated pulling.

Therefore one must ascertain that despite the motor running continuously the cylinder head must conditionally run "intermittently".

The mechanism provided internally in the cylinder head in the embodiment shown in FIG. 3, is similar to that of a torque wrench.

This embodiment of the mechanism comprises a plurality, at least two spring biased rotational motion transmitting elements 34 arranged so as to couple together two sections of the drive train, wherein one end of each of said rotational motion transmitting elements 34 is coupled in a fixed manner to a first section of the drive train, and a second end of which is coupled in a rotational motion transmitting but releasable engagement with a second section of the drive train, said elements 34 being radially displaced from the centre axis of the drive train and uniformly distributed around said axis in defined positions. In this way, when the outgoing side of the transmission mechanism experiences a predetermined resistance to rotation, caused by a pin bone being attached to the meat tissue with a force exceeding the force exerted by the rotational motion transmitting elements, the spring biased rotational motion transmitting elements slide out of their respective releasable engagement in said defined positions and jump into adjacent positions.

In particular, as shown in FIG. 3, there are provided a plurality of spring biased balls 34 provided between a back plate 36 and a front plate 38, arranged on opposite sides of the cylinder assembly 30, 32. The front plate 38 is connected to a drive axis (not shown), by any suitable means. In the embodiment in FIG. 3 the front plate has a tube shaped member 40 extending into the cylinder assembly 30, 32 through the centre bore 33 therein, and is rigidly attached to the drive shaft e.g. by a screw connection or the like. Needless to say, the winding has to be opposite to the direction of rotation of the drive axis.

Thus, the front plate will always rotate together with the drive shaft in a continuous movement.

The front plate 38, in the form of a circular element, is provided with a plurality of spherical recesses or detents 42, evenly distributed at the periphery of the circular element 38 in the transmission, and forming seats for the balls 34. The balls 34 are biased to sit in the detents by springs 43, suitably spiral springs. The back plate 36 is likewise provided with recesses 44 positioned so as to correspond to the detents for the balls 34, and forming seats for the springs 43.

The back plate is rigidly connected to the outer cylinder 30, suitably by providing matching windings on the periphery of the back plate and the inner surface of the cylinder, respectively, whereby the back plate 36 can be moved slightly in the longitudinal direction inside the outer cylinder 30 by screwing it inwards/outwards. In this way the spring bias on the balls 34 can be adjusted.

In the embodiment shown in FIG. 3, there is a circumferential recess on the tube shaped member 40. When all details have been assembled they are locked in place by means of a locking ring 45.

Thus, in the assembled state (which will be like the configuration shown in FIG. 2), and when the cylinder head 20 is rotated by actuating the motor to rotate the drive axis, the entire assembly will of course rotate at the same speed as the drive axis.

However, when a pin bone is caught in the nip between the cylinder 20 and the tongue 24 there will be some resistance, the magnitude of which will depend on how strongly the bone is attached to the tissue on the fish. If the spring bias on the balls 34 is correctly set, and the force in the connection between bone and tissue is strong enough, the springs 43 will yield and the balls 34 resting in the detents 42 on the front plate 38, will slide out of the detents 42 and jump to an adjacent position. Thus, the cylinder will stop moving for a fraction of a second, and in effect what happens is that the bone is pulled on without coming loose. However, when this action is repeated over and over again, the strong connection between bone and tissue will be gradually loosened and eventually the bone will come off without breaking. Normally it will require 3-8 pulls before the bone comes loose.

Figure 4:
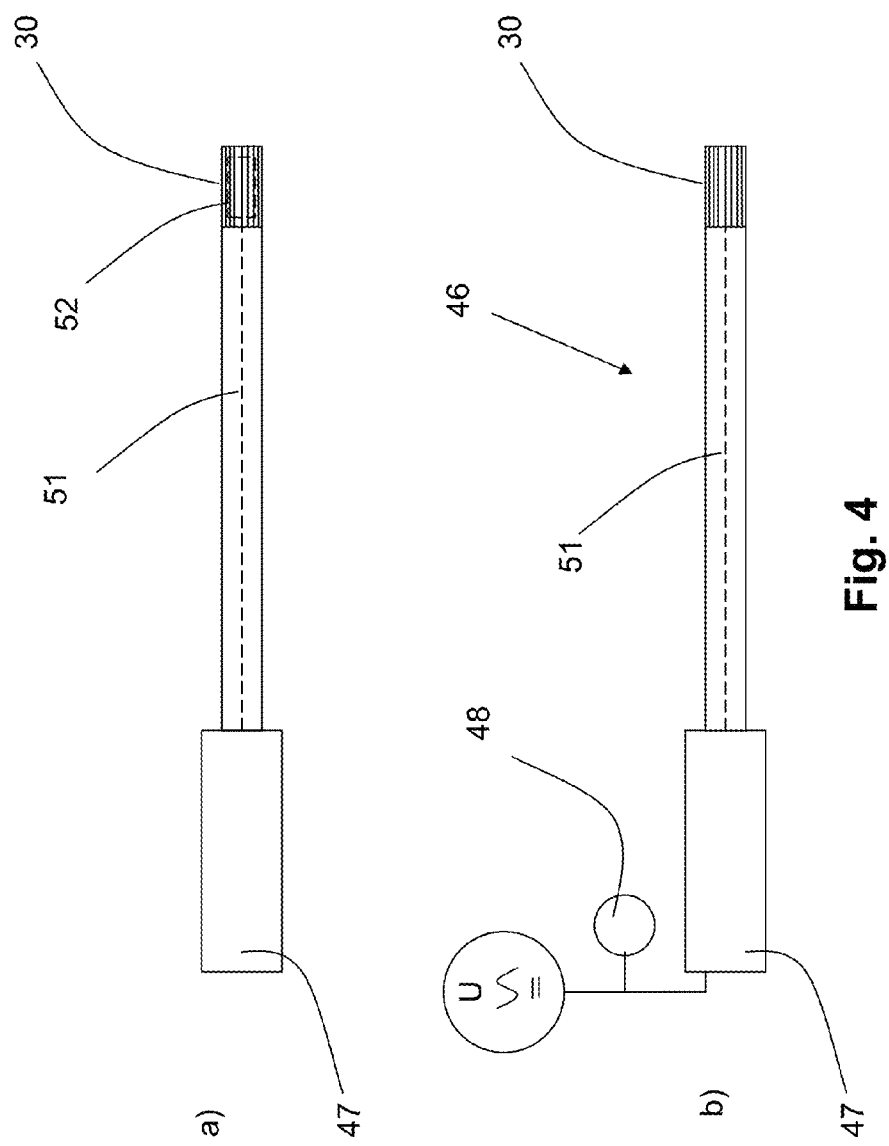
FIG. 4a is a schematic illustration of an exemplary embodiment of an apparatus according to the invention.
FIG. 4b is a schematic illustration of an electronic implementation of the invention.

FIG. 4a shows schematically a hand held tool according to the invention. It comprises essentially the same components as the prior art device shown in FIG. 2.

However, according to the invention there is provided a torque limiter 52 inside the cylinder head 30. It should be noted that although the shown embodiment has a torque limiter in the cylinder head, it is equally possible and within the scope of the invention to locate the torque limiter in the motor 47 or to integrate it in the drive axis 51 (provided inside a housing and shown with broken line).

In another embodiment of the invention the mechanism for generating the intermittent motion of the cylinder head is implemented electronically.

Thereby, there is a control unit provided for sensing a motor current peak that occurs when the system experiences a resistance from a pin bone that is more strongly attached to the meat than normal. This is schematically illustrated in FIG. 4b, showing a pin bone remover 46 driven by a motor 47, powered by a voltage source U, and having a control unit 48 including means for sensing variations in the motor current. Thus, when the sensing system in the control unit registers increased power consumption in the motor, i.e. by detecting a positive gradient in motor current, caused by increased resistance from a bone which requires more power, and when said current gradient exceeds a certain preset level, the control system immediately reacts by switching off the current supply to stop the motor from rotating, and thus the pulling on the bone is interrupted for a fraction of a second. Then immediately the current is switched on again and the motor starts rotating and consequently the pulling on the bone is resumed. This interruption/resuming of motor operation, causing an intermittent pulling on the pin bone is to be repeated until the pin bone comes loose.

In practice the mechanism described above is a "torque limiter" of the ball detent type. By this we mean that the mechanism is implemented in such a way that at a preset torque the mechanism will uncouple the drive temporarily during the split second when the balls jump from one position to an adjacent position.

Furthermore, while the invention has been described with reference to an embodiment functioning as a torque limiter of the "ball detent" type, in principle any other design of a torque limiter is possible as long as it fits in the configuration of a pin bone remover device as disclosed herein.

A torque limiter in general is a device that protects mechanical equipment, or its work, from damage by mechanical overload. A torque limiter may limit the torque by slipping (as in a friction plate slip-clutch), or uncouple the load entirely (as in a shear pin). There are many types of torque limiters.

Disconnect type torque limiters will uncouple the drive, with little or no residual torque making its way to the load. They may reset automatically or manually. Examples are given below.

A shear pin type torque limiter sacrifices a mechanical component, the pin, to disconnect the shafts. This is unsuitable in the present invention, since it must be resettable.

A synchronous magnetic torque limiter uses permanent magnets mounted to each shaft, with an air gap between. They are very fast acting, but may have more backlash than mechanical types. Because there is no mechanical contact between the two shafts, they are also used to transmit torque through a physical barrier like a thin plastic wall. On some models, the torque limit may be adjusted by changing the gap between the magnets.

A ball detent type limiter transmits force through hardened balls which rest in detents on the shaft and are held in place with springs. An over-torque condition pushes the balls out of their detents, thereby decoupling the shaft. It can have single or multiple detent positions, or a snap acting spring which requires a manual reset. There may be a compression adjustment to adjust the torque limit.

A pawl and spring type of torque limiter uses a spring to hold a drive pawl against a notch in the rotor. It may feature automatic or manual reset. A compression adjustment on the spring determines the torque limit.

Torque limiting types devices will limit the torque by slipping, i.e. letting the drive shaft run faster than the driven shaft. Excess power is dissipated as heat.

They do not need to be reset.

Friction plate type torque limiters are similar to a friction plate clutch. Over-torque will cause the plates to slip. A simple example is found in a fixed-spool fishing reel, where the slipping torque is set by means of a large hand nut in order that the reel will turn and allow more line to unwind before the line breaks under the pull of a fish.

A magnetic particle clutch can be used effectively as a torque limiter. The torque setting fairly approximates a linear relationship with the current passing through the windings, which can be statically or dynamically set depending on needs.

Magnetic hysteresis torque limiters are non-synchronous in normal operation, so there is always some slippage.

The invention has been described above in connection with FIGS. 3 and 4 as implemented in a hand-tool as shown in FIG. 2. Thereby the mechanism according to the invention is integrated in the cylinder head 20.

However, it can also be implemented in table-based boning machines where fish fillets are conveyed on a conveyor band and passed beneath a bone remover.

In such a case, the rotating cylinder head can be driven either directly as in the hand tool, or indirectly via a belt transmission. In the latter case the motor axis is provided with a pulley around which a belt is placed and running and coupled to a pulley on the cylinder head.

In the first alternative the invention would be implemented similarly to the embodiment in FIG. 3, i.e. in the cylinder head or in the pulley. In the latter case, the mechanism can be integrated in the pulley on the motor axis instead. The various options of locating the mechanism are indicated schematically in FIGS. 5a) and b), which show a motor 50, a drive axis 51, a pin bone removing unit 53 and a bench 54 on which a fish fillet 55 is placed in position under a cylinder head 56.

FIG. 5a) shows an alternative wherein the transmission mechanism is provided as a separate unit 52 on the drive axis 51.

FIG. 5b) shows an alternative wherein the transmission mechanism 51 (shown in broken lines) is provided in one of the pulleys 57 forming part of a belt transmission.

Thus, the torque limiter can be integrated in principle at any point in the drive train of a pin boning machine or apparatus, be it a hand tool or a table based machine.

According to the invention there is also provided a method of removing pin bones from fish fillets, wherein the method comprises pinching the pin bone in question between a rotating cylinder with recesses and a resilient tongue in contact with the cylinder, whereby when the pinching is performed a pulling force is applied to the fish bone. The method is characterized in that during the pinching, the pulling force is applied to the fish pin bone until the force reaches a preset level, at which the pulling is interrupted for a short period of time, unless the pin bone immediately comes loose, and if it does not come loose the pulling force is applied again until it reaches the preset level, and this process is repeated until the bone comes loose.

Preferably, the method comprises using a torque limiter and setting a maximum allowed torque at which the drive on the cylinder is released in order to provide for the interrupted pulling.

The invention claimed is:

1. A pin bone removing apparatus for removing pin bones from fish fillets, the apparatus comprising
   a drive train including a motor,
   a drive axis coupled to the motor, and
   a rotatable cylinder head coupled to said drive axis,
   wherein the cylinder head has a recessed envelope surface, and a resilient tongue in contact with said envelope surface, such that pin bones can be pinched between the tongue and the envelope surface when the cylinder head is rotated so as to be pulled out from the fillet;
   and wherein the apparatus further comprises a torque limiter in the drive train, that for a preset torque value will uncouple the rotatable cylinder head.

2. The apparatus as claimed in claim 1, wherein the torque limiter comprises a mechanism adapted to cause intermittent pulling of pin bones conditional on the force with which the bones are attached to the tissue in the fish fillet, wherein the mechanism comprises:
   at least two spring biased rotational motion transmitting elements arranged so as to couple together two sections of the drive train,
   wherein one end of each of said rotational motion transmitting elements is coupled in a fixed manner to a first section of the drive train, and
   a second end of which is coupled in a rotational motion transmitting but releasable engagement with a second section of the drive train,
   said elements being radially displaced from the centre axis of the drive train and uniformly distributed around said axis in defined positions,
   whereby when a predetermined resistance to rotation is experienced by the mechanism, said resistance being caused by a pin bone being attached to the meat tissue with a force exceeding the force exerted by the rotational motion transmitting elements, the spring biased rotational motion transmitting elements slide out of their respective releasable engagement in said defined positions and jump into adjacent positions.

3. The apparatus as claimed in claim 2, wherein the second end of each spring biased force transmitting element rests in one of a plurality of detents evenly distributed at the periphery of a circular element forming one of said sections in the drive train.

4. The apparatus as claimed in claim 3, wherein the spring biased rotational motion transmitting elements comprise balls, and are biased by springs.

5. The apparatus as claimed in claim 4, wherein the springs are spiral springs.

6. The apparatus as claimed in claim 2, wherein the spring biased rotational motion transmitting elements comprise balls, and are biased by springs.

7. The apparatus as claimed in claim 6, wherein the springs are spiral springs.

8. The apparatus as claimed in claim 1, wherein the springs are coupled to a circular plate threaded into the rotatable cylinder head, whereby said preset torque can be adjusted by screwing the circular plate inwards or outwards.

9. The apparatus as claimed in claim 1, wherein the motor is an electric motor, and the apparatus comprises
   a control unit including a sensor for sensing variations in motor current, and
   means for temporarily switching off the motor current when the motor current increases above a threshold or when there is a positive current gradient that exceeds a preset magnitude, and for resuming the motor drive again after lapse of a finite time from said switching off.

10. A cylinder head for a pin bone removing apparatus, comprising means for coupling the cylinder head to a drive axis, the cylinder head comprising a torque limiter provided inside the cylinder head wherein the torque limiter is arranged to transfer rotational motion from the drive axis to the cylinder head, and to uncouple the drive axis when a preset torque is reached.

11. The apparatus as claimed in claim 1, wherein the apparatus is a hand tool, comprising
   a cylinder head and means for coupling the cylinder head to a drive axis, the cylinder head comprising a torque limiter provided inside the cylinder head wherein the torque limiter is arranged to transfer rotational motion from the drive axis to the cylinder head, and to uncouple the drive axis when a preset torque is reached.

12. The apparatus as claimed in claim 1, wherein the apparatus is a hand tool, comprising a torque limiter integrated in the drive axis or in the motor.

13. The apparatus as claimed in claim 1, wherein the apparatus is a table based machine, comprising a torque limiter provided either in the cylinder head, in the drive axis, in a pulley of a belt transmission or in the motor.

14. A method of removing pin bones from fish fillets, comprising pinching the pin bone between a rotating cylinder with recesses and a resilient tongue in contact with the cylinder, whereby when the pinching is performed a pulling force is applied to the fish bone;
   wherein during the pinching, the pulling force is applied to the fish pin bone until the force reaches a preset level, at which point the pulling is interrupted for a short period of time, unless the pin bone immediately comes loose, and if said pin bone does not come loose the pulling force is applied again until it reaches the preset level, this process being repeated until the bone comes loose.

15. The method as claimed in claim 14, wherein the interrupted pulling is achieved by utilizing a torque limiter and by setting a maximum allowed torque at which the drive on the cylinder is released.

\* \* \* \* \*